(12) United States Patent
Xu et al.

(10) Patent No.: US 12,647,029 B2
(45) Date of Patent: Jun. 2, 2026

(54) DIRECT CURRENT TO DIRECT CURRENT CONVERSION CIRCUIT, CONVERTER AND CONTROL METHOD THEREOF

(71) Applicant: HEFEI CLT MICROELECTRONICS CO. LTD, Hefei (CN)

(72) Inventors: Weiwei Xu, Hefei (CN); Yunfeng Jiang, Hefei (CN)

(73) Assignee: HEFEI CLT MICROELECTRONICS CO. LTD, Hefei (CN)

( * ) Notice: Subject to any disclaimer, the term of this patent is extended or adjusted under 35 U.S.C. 154(b) by 207 days.

(21) Appl. No.: 18/736,747

(22) Filed: Jun. 7, 2024

(65) Prior Publication Data

US 2024/0356436 A1 Oct. 24, 2024

Related U.S. Application Data

(63) Continuation of application No. PCT/CN2024/075470, filed on Feb. 2, 2024.

(30) Foreign Application Priority Data

Apr. 20, 2023 (CN) .......................... 202310425503.2

(51) Int. Cl.
*H02M 3/07* (2006.01)
*H02M 1/00* (2006.01)
*H02M 7/483* (2007.01)

(52) U.S. Cl.
CPC ........... *H02M 3/07* (2013.01); *H02M 1/0095* (2021.05); *H02M 7/4837* (2021.05)

(58) Field of Classification Search
CPC ..... H02M 3/07; H02M 1/0095; H02M 7/4837
See application file for complete search history.

(56) References Cited

U.S. PATENT DOCUMENTS

| | | | | |
|---|---|---|---|---|
| 2021/0288581 A1* | 9/2021 | Zhu | .......................... | H02M 3/07 |
| 2022/0181973 A1* | 6/2022 | Huang | .................... | H02M 3/06 |

(Continued)

FOREIGN PATENT DOCUMENTS

| | | |
|---|---|---|
| CN | 106329921 A | 1/2017 |
| CN | 113054838 A | 6/2021 |

(Continued)

OTHER PUBLICATIONS

International Search Report for corresponding International Patent Application No. PCT/CN2024/075470, mailed May 10, 2024, 4 pages.

(Continued)

*Primary Examiner* — Lakaisha Jackson
(74) *Attorney, Agent, or Firm* — Cooper Legal Group, LLC

(57) ABSTRACT

A direct current to direct current conversion circuit includes: an input end, a first flying capacitor, a second flying capacitor, a power inductor, a first state switch, a second state switch, and an output end; when the first state switch is turned on, and the second state switch is turned off, the input end, the first flying capacitor, the power inductor, the second flying capacitor and the output end are connected, the power inductor and the second flying capacitor supply power to the output end, and the first flying capacitor and the chip inductance are charged; and when the first state switch is turned off, and the second state switch is turned on, the first state flying capacitor, the power inductor, the second flying capacitor and the output are connected, the power inductor and the flying capacitor supply power to the output end, and the second flying capacitor is charged.

9 Claims, 6 Drawing Sheets

(56)  References Cited

U.S. PATENT DOCUMENTS

2022/0278611 A1 *   9/2022   Tsuda ..................... H02M 1/007
2022/0345042 A1 *  10/2022   Ruggeri .............. H02M 1/0095

FOREIGN PATENT DOCUMENTS

| | | | |
|---|---|---|---|
| CN | 114285280 | A | 4/2022 |
| CN | 116131602 | A | 5/2023 |
| DE | 102020213004 | A1 | 12/2021 |
| EP | 3709490 | A1 | 9/2020 |

OTHER PUBLICATIONS

Wang, C., et al., "A Highly Integrated Tri-Path Hybrid Buck Converter With Reduced Inductor Current and Self-Balanced Flying Capacitor Voltage", IEEE Transactions on Circuits and Systems I: Regular Papers, Sep. 2022, 69(9): 3841-3850.

* cited by examiner

DIRECT CURRENT TO DIRECT CURRENT CONVERSION CIRCUIT, CONVERTER AND CONTROL METHOD THEREOF

CROSS-REFERENCE TO RELATED APPLICATIONS

This application is a continuation of PCT application serial no. PCT/CN2024/075470, filed on Feb. 2, 2024, which claims the priority and benefit of Chinese patent application serial no. 202310425503.2, filed on Apr. 20, 2023. The entireties of PCT application serial no. PCT/CN2024/075470 and Chinese patent application serial no. 202310425503.2 are hereby incorporated by reference herein and made a part of this specification.

TECHNICAL FIELD

The present application generally relates to a circuit technical field, and in particular, relates to a direct current to direct current (DC-DC) conversion circuit, converter and control method thereof.

BACKGROUND

At present, a DC-DC converter with high conversion rate is widely used in data centers, 5G base stations, system on chip and other fields. The system on chip (SoC) of portable electronics is token as example, as the required supply voltage gradually decreases to 1V or even below, the present portable electronic device products have a relatively large application requirement for step-down DC-DC converter with high conversion rate supplying by lithium battery (3V~4.5V), and the output thereof is lower than 1V. further, as modules and computing power of the SoC continue to increase, and a load current of a power chip gradually increases, a conduction loss seriously influences an overload efficiency. Furthermore, the requirement of miniaturizing the products means that the power chip should uses smaller passive elements, thereby improving overall power density. Therefore, it becomes a major technical difficulty that how to improve the efficiency and the power density of the step-down DC-DC converter with the high conversion rate applying power to the SoC supply.

Under the application environment of the high conversion rate, it generally uses a single-stage hybrid DC-DC converter composed of a flying capacitor and an inductance to realize a requirement of a high efficiency. However, the traditional hybrid DC-DC converter, such as multilevel DC-DC converter and so on, generally needs additional flying capacitors to balance the circuit and to ensure a reliability of the system, and the average inductance current is equal to the load current in these topology architectures, the loss of the inductance is a relatively high proportion in the total loss, which influences the performance of the system under the overload condition, and limits an improvement of the efficiency and the power density, simultaneously. A dual path hybrid DC-DC converter supplies power to the output by the switch capacitor structure and the inductance, which can realize a self-balance of the flying capacitor voltage, simplify the control stage circuit, and reduce the average inductance current, thereby improving the efficiency and the power density of the system. However, in the existing dual path hybrid direct current-hybrid direct current converter, the decrease of the average inductance current is limited, especially under the relatively high conversion rate, the average inductance current is close to the load current, the performance is close to the traditional hybrid DC-DC converter, which has little effect for the decrease of the inductance conduction loss.

SUMMARY

A DC-DC conversion circuit, converter and control method thereof of the present application are disclosed. A flying capacitor is used to shunt to reduce an average inductance current, thereby reducing an inductance conduction loss, basically.

In the first aspect, the present application discloses a DC-DC conversion circuit including an input end, a first flying capacitor, a second flying capacitor, a power inductor, a first state switch, a second state switch, and an output end; wherein the first state switch comprises a first switch tube, a second switch tube and a third switch tube, the second state switch comprises a fourth switch tube, a fifth switch tube and a sixth switch tube;

the input end, the first switch tube, the fifth switch tube, the third switch tube and the output end are successively connected; the first flying capacitor and the power inductor are connected to each other and connected in parallel at two ends of the fifth switch tube, a first end of the fourth switch tube is connected to a connection point of the first switch tube with the power inductor, a second end of the fourth switch tube is connected to ground; the second flying capacitor and the sixth switch tube are connected to each other and connected in parallel at two ends of the third switch tube, a first end of the second switch tube is connected to a connection point of the second flying capacitor with the sixth switch tube, a second end of the second switch tube is connected to the ground;

when the first state switch is turned on and the second state switch is turned off, the input end, the first flying capacitor, the power inductor, the second flying capacitor and the output end are connected, the power inductor and the second flying capacitor supply power to the output end; the first state switch and the power inductor are charged; and when the first state switch is turned off and the second state switch is turned on, the first flying capacitor, the power inductor, the second flying capacitor and the output end are connected, the power inductor and the first flying capacitor supply power to the output end; the second flying capacitor is charged.

Optionally, when the first state switch is turned on and the second state switch is turned off, the input end, the first flying capacitor, the power inductor, the second flying capacitor and the output end are connected, including:

the input end, the first switch tube, the first flying capacitor, the power inductor, the third switch tube and the output end are successively connected;

the second switch tube and the second flying capacitor are connected in series; an end of the second flying capacitor not connected to the second switch tube is connected to a connection point of the power inductor with the third switch tube; and the second switch tube is connected to the ground.

Optionally, when the first state switch is turned off and the second state switch is turned on, the first flying capacitor, the power inductor, the second flying capacitor and the output end are connected, including:

the fourth switch tube, the first flying capacitor, the fifth switch tube, the second flying capacitor, the sixth switch tube and the output end are successively connected; and a first end of the power inductor is connected to a connection point of the fourth switch tube with the first flying capacitor, a second end of the power inductor is connected to a connection point of the fifth switch tube with the second flying capacitor.

Optionally, the output end includes an output capacitor, and one end of the output capacitor is connected to the ground.

Optionally, a switching frequency of the circuit is 0.5 MHz~2 MHz, the switching frequency is determined by the conduction state switch of the first state switch and the second state switch;

an inductance value of the power inductor is 0.1 μH~4.7 μH;

a capacity value of the first flying capacitor is 1 μF~20 μF; and a capacity value of the second flying capacitor is 1 μF~20 μF.

In the second aspect, the present application discloses a DC-DC converter including the DC-DC conversion circuit according to any items of the first aspect.

Optionally, the DC-DC converter further includes a control stage circuit;

the output end of the DC-DC conversion circuit is connected to an input end of the control stage circuit; and the output end of the control stage circuit is connected to the first state switch and the second state switch.

Optionally, the control stage circuit includes an error amplifier, a PWM generator and a drive circuit successively connected;

an output end of the error amplifier is connected to the output end of the DC-DC conversion circuit and an output end of a reference voltage, respectively, an output voltage is compared with the reference voltage to obtain an error signal, and to input to the PWM generator;

an input end of the PWM generator is further configured to be connected to an output end of a ramp signal and an output end of a clock signal, a control signal is generated according to a magnitude relationship between the error signal and the ramp signal, and input to the drive circuit; and the drive circuit generates a drive signal according to the control signal to input to the first state switch and the second state switch.

In the third aspect, the present application discloses a control method of a DC-DC conversion circuit including:

in a first period of each cycle, controlling the first state switch to be turned on and the second state switch to be turned off, such that the input end, the first flying capacitor, the power inductor, the second flying capacitor and the output end are connected, the power inductor and the second flying capacitor supply power to the output end, and the first flying capacitor and the power inductor are charged; and in a second period of each cycle, controlling the first state switch to be turned off and the second state switch to be turned on, such that the first flying capacitor, the power inductor, the second flying capacitor and the output end are connected, the power inductor and the first flying capacitor supply power to the output end, and the second flying capacitor is charged.

The present application discloses a DC-DC conversion circuit including: the input end, the first flying capacitor, the second flying capacitor, the power inductor, the first state switch, the second state switch and the output end; when the first state switch is turned on and the second state switch is turned off, the input end, the first flying capacitor, the power inductor, the second flying capacitor and the output end are connected, the power inductor and the second flying capacitor supply power to the output end, the first state switch and the power inductor are charged; and when the first state switch is turned off and the second state switch is turned on, the first flying capacitor, the power inductor, the second flying capacitor and the output end are turned on, the power inductor and the first flying capacitor supply power to the output end, the second flying capacitor is charged.

Under two work states, there is always a flying capacitor and the power inductor supplying power to the output end, which has a shunting effect, by which the charge or discharge relationship of the flying capacitor is adjusted in different switch states, thereby effectively improving the total charge of the flying capacitor supplying for the load, and significantly reducing the average inductance current. When the load of the output ends are consistent, it is compared with the situation that the ratio of the inductance current and the load current is close to 1 in the existing technology, the proportion of the inductance current can be much less than 1, thereby realizing a further decrease of the inductance conduction loss.

The converter disclosed of the present application can be used to realize a supply requirement of the high conversion rate system on chip with lithium battery voltage input and output below 1V, uses the flying capacitor to shunt to reduce the average inductance current (less than ½ of the load current under the total conversion rate) and to reduce the inductance conduction loss, thereby improving the efficiency, relaxes the demand of the large magnitude and high performance inductance, saves an area of the passive elements, thereby improving the power density, and have a characteristic of the voltage self-balance of the flying capacitor, by which it is not necessary to have an additional flying capacitor to balance the current, and may not increase the complexity of the control current.

BRIEF DESCRIPTION OF THE DRAWINGS

In order to make a more clear illustration of a solution of Embodiments in the present application or the existing technology, the drawings necessarily used in the Embodiments or the existing technology are briefly introduced as following. Obviously, the drawings in the following description are some Embodiments of the present application, for the ordinary skill in the art, without the premise of the creative work, it may further obtain other drawings according to these drawings.

DETAILED DESCRIPTION

Figure 1:
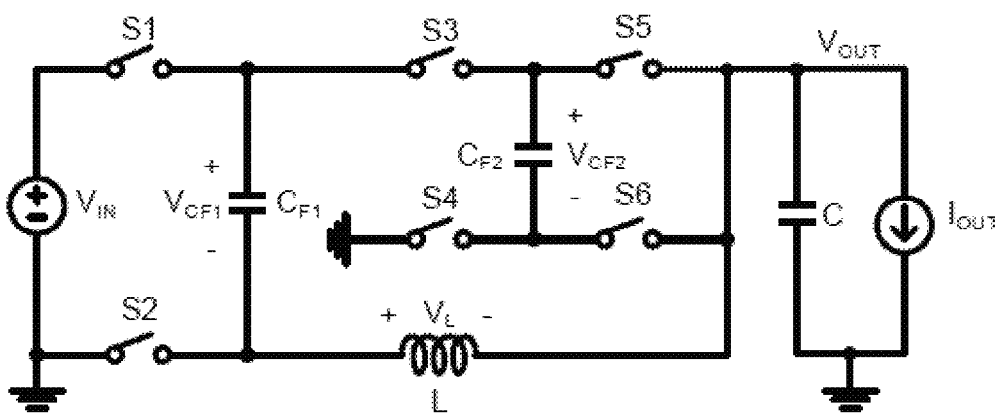
FIG. 1 is a schematic circuit structure view of a first existing dual path hybrid step-down direct current—direct current converter of an Embodiment in the present application.

In order to make it more clear of target, solution and advantage of Embodiments of the present application, the solution of Embodiments of the present application is clearly and completely described below in combination with drawings. Clearly, the described Embodiments are a part of Embodiments of the present application, but not total Embodiments. Based on the Embodiments of the present application, all other Embodiments obtained by the ordinary skill in the art without the creative work are belonged to protection scope of the present application.

Further, the term "and/or" in the present application is only an association relationship for describing the related objects, which means that there are three relationships, for example, A and/or B means: single A, A and B, and single B. Furthermore, the character "/" in the present application without any special description generally shows a "or" relationship of the front-back related objects.

The Embodiments of the present application are further described in detail in combination with the description drawings.

As a single stage hybrid DC-DC converter, a switch capacitor converter and an inductance capacitor are two main solution. In particular, the switch capacitor is composed of a switch and a capacitor, can effectively reduce a withstanding voltage of a transistor, has a relatively high integration level, which is easy to realize a high efficiency under a relatively high conversion rate and a special power density, however, in order to improve a precision of the conversion rate to realize a total high efficiency in the scope of wide input/wide output, it generally needs to use a relatively complex reconfigurable topology. The inductance converter can simultaneously realize a continuously wide conversion rate and high conversion efficiency, however, the physical magnitude of the inductance is relatively large in the application, which may greatly influence the power density, and since the duty cycle signal width is relatively narrow under the high conversion rate, it increases difficulties for the design of the control current. In order to realize a balance between the efficiency and the power density, it uses a hybrid converter power topology with the capacitor and the inductance, which combines advantages of each of two structures, and becomes a current application trend.

As the traditional hybrid DC-DC converter, which is same as the traditional step-down direct current-direct converter, the average inductance current is the output current, therefore, the conduction loss proportion of the inductance is relatively large. In order to reduce this part loss, it needs a large magnitude and relatively low direct current resistance (DCR) inductance, however, which may greatly increase the magnitude of the passive elements, and reduce the whole power density between the chip and the passive elements. Furthermore, in order to ensure that the withstanding voltage of the transistor is a safe scope, the traditional hybrid DC-DC converter generally needs an additional flying capacitor balance technology, which may increase the complexity of the current.

For recent years, dual path hybrid converter reducing the average inductance current becomes a research hotpot. These hybrid converter uses the structure of the switch capacitor, which reduces the withstanding voltage of the transistor while sharing a portion of the inductance current to supply power to the output, thereby reducing a dependence on the large magnitude and low DCR power density, and realizing the high efficiency and the high power density at same time. In the existing dual-path hybrid direct current-hybrid direct current converter, the reduction scope of the average inductance current is limited, especially under the relatively high conversion rate, the average inductance current is close to the load current, the performance thereof is close to the traditional hybrid DC-DC converter, which has a little effect for the reduction of the inductance conduction loss.

As one of dual path hybrid step-down direct current—direct current converter for example, FIG. 1 is a schematic structure of the circuit. As shown in FIG. 1, it includes two flying capacitors $C_{F1}$, $C_{F2}$, a capacitor C, an inductance L, and six transistors S1, S2, S3, S4, S5, and S6, and the connection relationship of elements are shown as FIG. 1.

Figure 2:
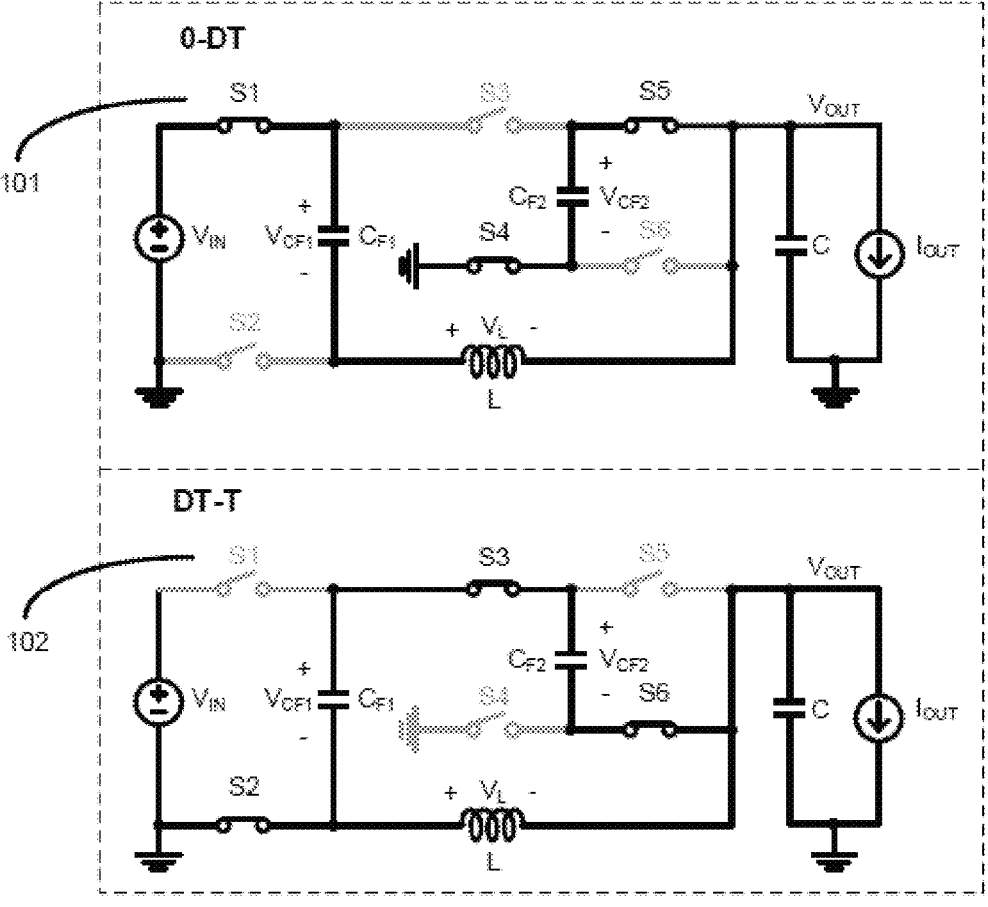
FIG. 2 is a power stage work circuit view of a circuit shown in FIG. 1.

Each transistor is controlled by the control signal of the controller, the duty cycle of the control signal is D. A power stage work sequence is shown in FIG. 2 under the control of the control signal. Within one switch cycle T, in 0-DT time, the control signal enables, the switch transistors S1, S4 and S5 are turned on, the switch transistors S2, S3 and S6 are turned off, the current enters to 101 state, the inductance L is charged; and in DT-T time, the control signal does not enables, the switch transistors S2, S3 and S6 are turned on, the switch transistor S1, S4 and S5 are turned off, the current enters to 102 state, and the inductance is discharged.

For the volt-second balance of the inductance, combining with the 101 state current, it can be known that:

$$(V_{IN} - V_{OUT} - V_{CF1})D = V_{OUT}(1 - D)$$

Under the 101 state:

$$V_{CF2} = V_{OUT}$$

Under the 102 state:

$$V_{CF1} - V_{CF2} = V_{OUT}$$

Combining two states, it can be known that:

$$V_{CF1} = 2V_{OUT}$$

Which substitutes to the voltage-second balance formula under 101 state to acquire a voltage conversion rate M.

$$(V_{IN} - 3V_{OUT})D = V_{OUT}(1 - D) \qquad (1)$$

$$M = \frac{V_{OUT}}{V_{IN}} = \frac{D}{1 + 2D} \qquad (2)$$

In particular, M is a voltage conversion rate, $V_{IN}$ is a converter input voltage, $V_{OUT}$ is a conversion output voltage, D is a duty cycle of the switch control signal (0<D<1).

For the charge conservation of the inductance, combining with 101 state current, it can be known that $C_{F1}$ is charged under the 101 state, in which the charge amount thereof is the product of the average inductance current and the time:

$$Q_{C1} = DTI_L$$

$C_{F2}$ is charged under the 102 state, in which the charge amount thereof is equal to the discharge amount of the $C_{F1}$, which means that the charge amount of $C_{F1}$ is the product of the average inductance current and the time under 101 state.

$$Q_{C2} = DTI_L$$

Therefore, the charge amount of two flying capacitors totally supplying for the load in a cycle is as follows:

$$Q_C = Q_{C1} + Q_{C2}$$

The charge amount of the inductance supplying tor the load in the cycle is as follows:

$$Q_L = TI_L$$

The charge amount required of the output load in the cycle is $TI_{OUT}$; and combining above formula, it can acquire a ratio of the average inductance current and the load current.

$$Q_{C1} + Q_{C2} + Q_L = DTI_L + DTI_L + TI_L = TI_{OUT} \qquad (3)$$

$$\frac{I_L}{I_{OUT}} = \frac{1}{1 + 2D} = 1 - 2M \qquad (4)$$

In particular, $I_L$ is the average inductance current, $I_{OUT}$ is the load current, T is a switch cycle of the conversion, DT is a conduction time of the transistor in each cycle. $Q_{C1}$ is the charge amount of the flying capacitor $C_{F1}$ transporting in a cycle T, $Q_{C2}$ is the charge amount of the flying capacitor $C_{F2}$ transporting in the cycle T, and $Q_L$ is the charge amount of the inductance L transporting in the cycle T.

Figure 3:
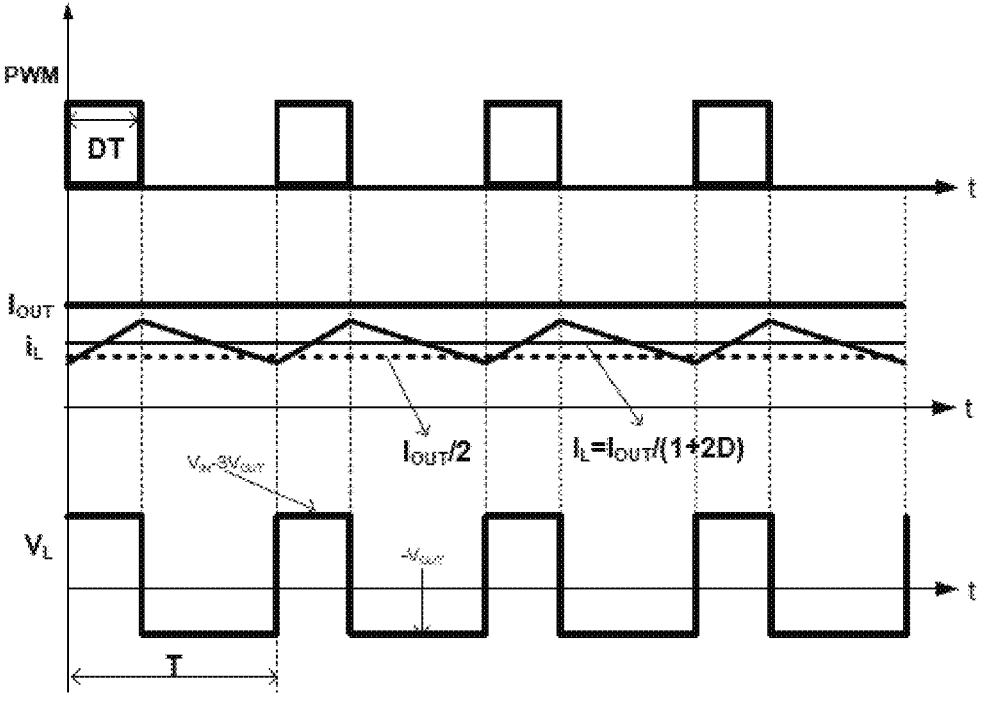
FIG. 3 is a steady state work sequence view of the circuit shown in FIG. 1.

FIG. 3 shows a steady state work sequence of this converter, for the formula (2), it can be determined that the voltage conversion rate of the converter is (0, ⅓), which is suitable for the scenes of the high conversion rate with lithium battery power supply and output below 1V in intelligent electronic devices; for the formula (4), it can be determined that the ratio of the average inductance current and the load current of the conversion is (1/3, 1), and the ratio is inversely proportional to the duty cycle D, which means that, when D is close to 0, the current ratio is close to 1, in which the duty cycle D is more less, the reduction of the average inductance current is more less, it is limited for the reduction of the inductance conduction loss.

Figure 4:
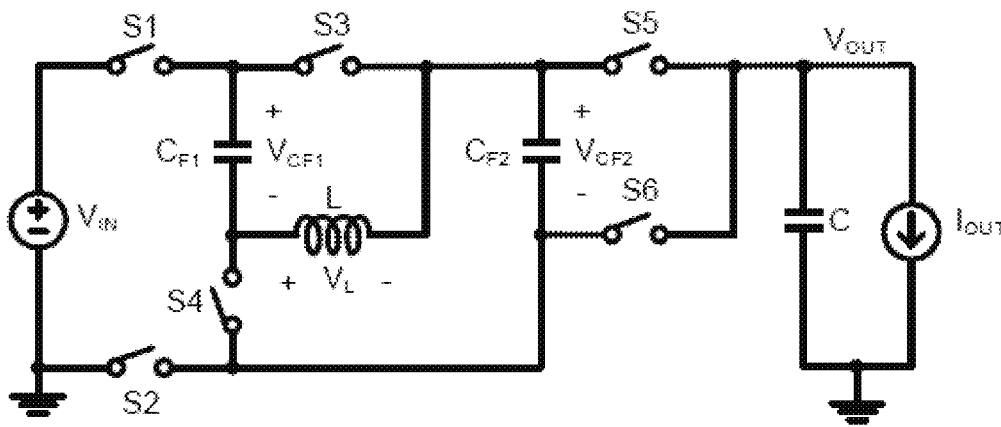
FIG. 4 is a schematic circuit structure view of a second existing dual path hybrid step-down direct current—direct current converter of the Embodiment in the present application.
Figure 5:
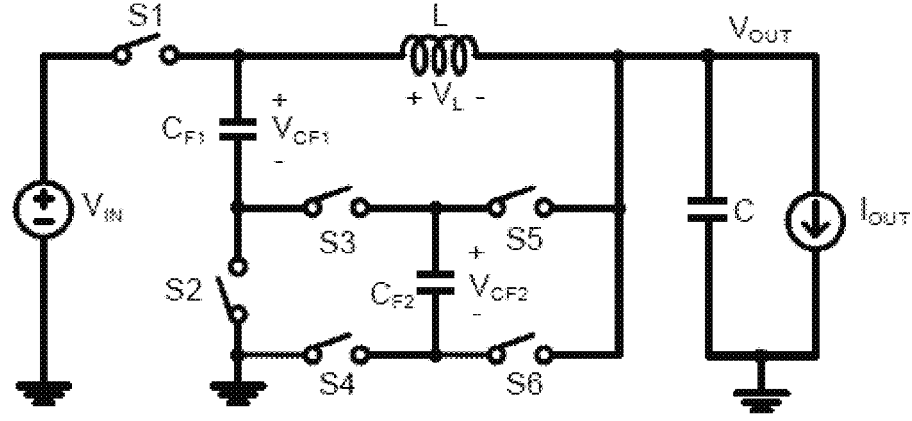
FIG. 5 is a circuit structure schematic view of a third existing dual path hybrid step-down direct current—direct current converter of the Embodiment in the present application.

FIGS. 4-5 shows other two existing dual path hybrid step-down direct current-direct current converter, which is similar to the structure of the converter in FIG. 1, and both uses two fly capacitors and one power inductor.

FIG. 4 shows a three path hybrid step-down direct current—direct current converter, in which the voltage conversion rate and the ratio of the average inductance current and the load current are completely consistent with the formula (2) and the formula (4), respectively, which means that the performance of the three path hybrid step-down direct current—direct current converter is same as the conversion in FIG. 1, which realizes the high conversion rate while reducing the conduction loss of the inductance, and improving the efficiency and the power density by reducing the average inductance current in a certain extent. FIG. 5 shows a constant dual path hybrid direct current—direct current converter, the ratio of the average inductance current and the load current is 1/(3-2D), and the ratio is (1/3, 1), however, the voltage conversion is 1/(3-2D), the ratio is (1/3, 1), and it is not suitable for the scenes with the high conversion rate.

In summary, the existing dual path hybrid conversion with the high conversion rate, in the duty cycle scope of 0-1, the average inductance current is 1/3 to 1 time for the load current, which cannot ensure that the average inductance current can be effectively reduced in total conversion rate range. Especially for the scene with relatively high conversion rate, the duty cycle is relatively small at this time, the ratio of the average inductance current and the load current is close to 1, which loses the advantage of the dual path hybrid conversion reducing the inductance conduction loss, thereby limiting the improvement of a chip efficiency and the power density.

Therefore, under the application background of the high conversion rate, how to effectively reduce the power stage average inductance, improve a system conversion efficiency, and reduce the used power inductance magnitude to improve the power density of the system is a research focus of the dual path hybrid conversion.

Based on the above description, the present application provides a new high performance dual path hybrid step-down direct current—direct current converter power stage topology structure, compared with above structure, under the condition of no additional element, it can realize the high conversion while optimizing the ratio of the average inductance current and the load current to 1/(2+D), to realize that the average inductance current is 1/3 to 1/2 time for the load current and constantly less than the 1/2 of the load current in the total duty cycle range, thereby effectively reducing the inductance conduction loss in the total conversion rate scope, relaxing the requirement for the large magnitude and small DCR inductance, and improving the chip efficiency and the power density. Meanwhile, the new topology structure possesses the flying capacitor voltage self-balance, and it does not need any additional flying capacitor voltage balance current.

The present application discloses a DC-DC conversion circuit including: the input end, the first flying capacitor, the second flying capacitor, the power inductor, the first state switch, the second state switch and the output end; when the first state switch is turned on and the second state switch is turned off, the input end, the first flying capacitor, the power inductor, the second flying capacitor and the output end are connected, the power inductor and the second flying capacitor supply power to the output end, and the first state switch and the power inductor are charged; and when the first state switch is turned off and the second state switch is turned on, the first flying capacitor, the power inductor, the second flying capacitor and the output end are connected, the power inductor and the first flying capacitor supply power to the output end, and the second flying capacitor is charged.

Under two work states, there is always a flying capacitor and a power inductor supplying power to the output end together, which plays a role in shunting, by which the charge or discharge relationship of the flying capacitor is adjusted under different switch states, thereby effectively improving the total charge amount of the flying capacitor supplying for the load, and significantly reduce the average inductance current. Under the situation of consistent output end, compared with the situation that the ratio of the inductance current and the load current is close to 1, the inductance current ratio can be much less than 1, thereby further reducing the inductance conduction loss.

In some Embodiments, the first state switch includes the first switch tube, the second switch tube and the third switch tube, and the second state switch includes the fourth switch tube, the fifth switch tube and the sixth switch tube.

Correspondingly, when the first state switch is turned on, and the second state switch is turned off, the input end, the first flying capacitor, the chip inductance, the second flying capacitor and the output end are connected, including as follows: the input end, the first switch tube, the first flying capacitor, the chip inductance, the third switch tube and the output end are successively connected; the second switch tube and the second flying capacitor are connected in series; the end of the second flying capacitor not connected to the second switch tube is connected to the connection point of the power inductor with the third switch tube; and the input end, the second switch tube and the output end are connected to the ground.

When the first state switch is turned off and the second state switch is turned on, the first flying capacitor, the chip inductance, the second flying capacitor and the output end are connected, including as follows: the fourth switch tube, the first flying capacitor, the fifth switch tube, the second flying capacitor, the sixth switch tube and the output end are successively connected; the first end of the power inductor is connected to the connection point of the fourth switch tube with the first flying capacitor, and the second end of the power inductor is connected to the connection point of the fifth switch tube with the second flying capacitor.

The above output end can include an output capacitor, and one end of the output capacitor is connected to the ground.

Figure 6:
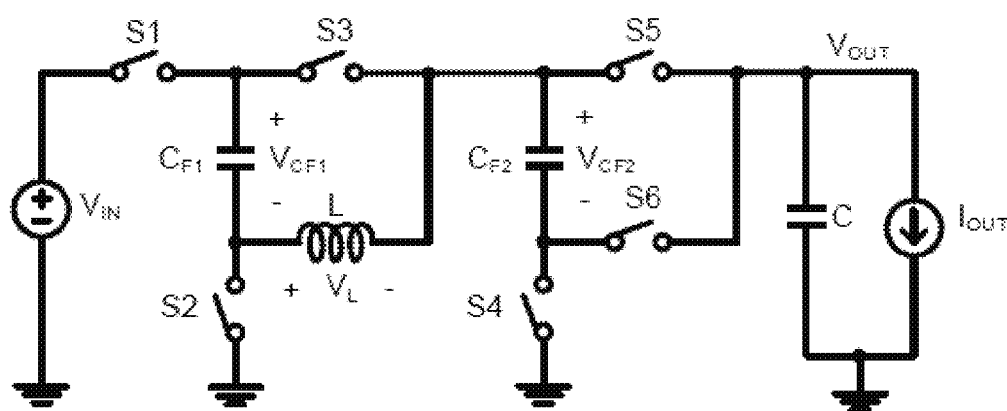
FIG. 6 is a schematic power stage topology structure view of a direct current—direct current conversion circuit of the Embodiment in the present application.

In a specific Embodiment, the power topology structure of the direct current—direct current conversion current is shown in FIG. 6. The power topology is composed of the six transistors S1, S2, S3, S4, S5, and S6, the two flying capacitors $C_{F1}$, and $C_{F2}$ and the power inductor L forming the structure of the dual path hybrid direct current—direct current converter, which is configured to converter an inputted high voltage direct current $V_{IN}$ to a stability lower voltage direct current $V_{OUT}$ output with ripple. In the architecture, not only does the power inductor L supplies power to the load, but also the switch capacitor composed of the two flying capacitors $C_{F1}$, $C_{F2}$, relying on a characteristic of the charge discharge conservation, supplies partial charge to the load. Therefore, the flying capacitors share portion average inductance current to reduce the average inductance current flowing through the power inductance L, thereby reducing the inductance conduction loss.

Figure 7:
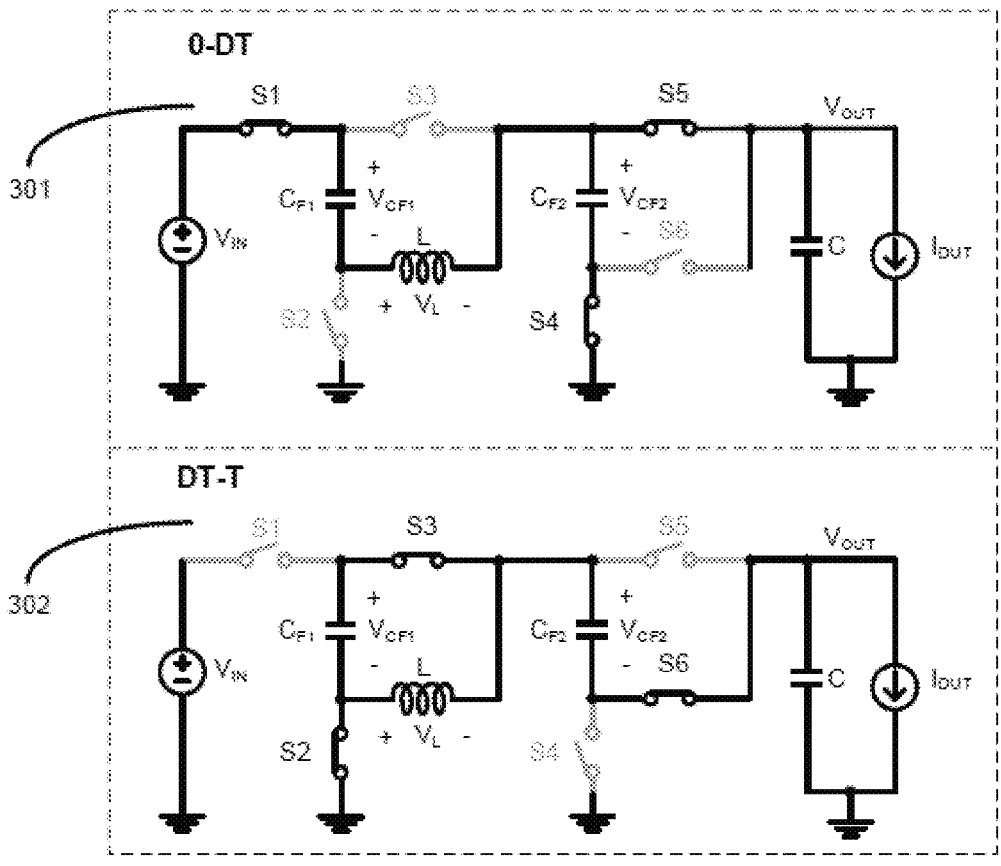
FIG. 7 is the power stage work circuit of the circuit shown in FIG. 6.

Each transistor is controlled by the control signal of the controller, and the duty cycle of the control signal is D. under the control of the control signal, the power stage work sequence is shown in FIG. 7. Within the switch cycle T, in the 0-DT time, the control signal enables, in the first state switch, the first switch tube S1, the second switch tube S4 and the third switch tube S5 are turned on, the fourth switch tube S2, the fifth switch tube S3 and the sixth switch tube S6 are turned off, the current enters to 301 state, the inductance L and the flying capacitor $C_{F1}$ is charged, the flying capacitor $C_{F2}$ is discharged, and at this time, $C_{F2}$ and the L are connected in parallel and served as the dual path capacitor to supply power to the load; in the DT-T time, the control signal does not enables, the transistor S2, S3 and S6 are turned on, the transistor S1, S4 and S5 are turned off, the current enters to the 302 states, the flying capacitor $C_{F2}$ is charged, the inductance L and the flying capacitor $C_{F1}$ is discharged, and at this time, $C_{F1}$ and the L are connected in parallel and served as the dual path capacitor supplying power to the load. The charge conservation is composed of the behaviors under two states.

Figure 8:
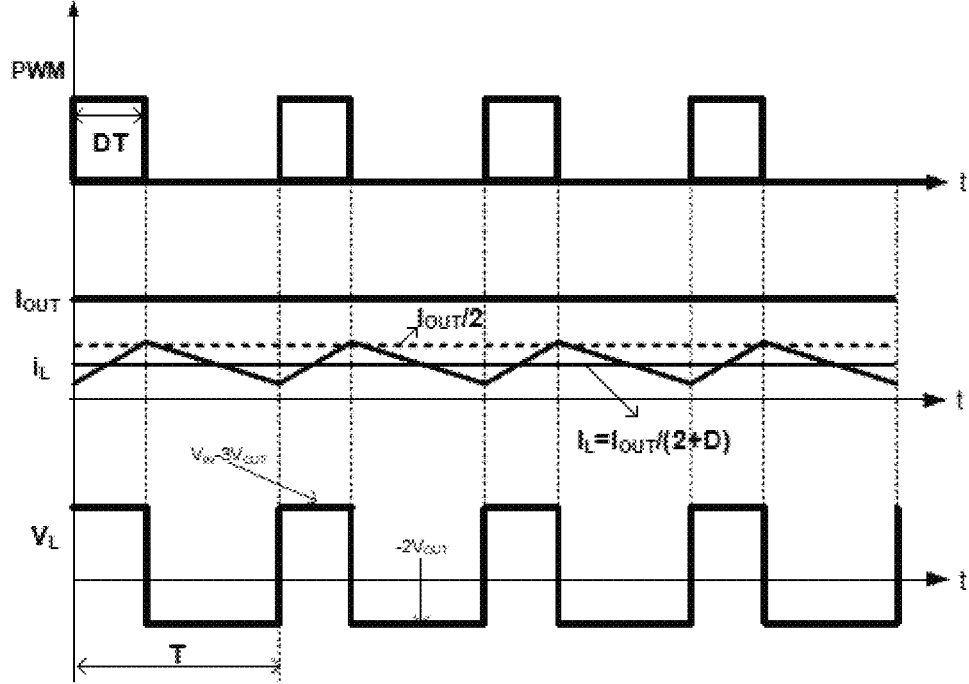
FIG. 8 is the steady state work sequence of the circuit shown in FIG. 6.

Combining with work state FIG. 7 and steady state work sequence FIG. 8, for the volt-second balance of the inductance, it can be known that:

$$(V_{IN} - V_{OUT} - V_{CF1})D = (V_{CF2} + V_{OUT})(1 - D)$$

Under 301 state:

$$V_{CF2} = V_{OUT}$$

Under 302 state:

$$V_{CF1} = V_{CF2} + V_{OUT}$$

It can be known by combining two state:

$$V_{CF1} = 2V_{OUT}$$

which substitutes to the voltage-second balance formula of the 301 state to acquire the voltage conversion ratio M.

$$(V_{IN} - 3V_{OUT})D = 2V_{OUT}(1 - D) \tag{5}$$

$$M = \frac{V_{OUT}}{V_{IN}} = \frac{D}{2 + D} \tag{6}$$

In particular, M is a voltage conversion rate, $V_{IN}$ is an input voltage of the conversion, $V_{OUT}$ is an output voltage of the conversion, D is the duty cycle of the control signal of the transistor $(0 < D < 1)$.

Since the characteristic of the switch capacitor structure, the flying capacitor directly identifies the output voltage, which are $V_{CF1} = 2V_{OUT}$ and $V_{CF2} = V_{OUT}$, respectively. therefore it can realize the self-balance of the flying capacitor voltage, and it is not necessary for additional flying capacitor balance circuit and complex loop analysis. The control stage circuit can be controlled by the traditional step-down direct current—direct current conversion voltage model, it needs only a stable loop, which simplifies the design of the control stage circuit.

For the charge conservation of the capacitor, combining the 301 state circuit, it can be known that, when the $C_{F1}$ is charged under the 101 state, the charge amount is the product of the average inductance current and the time:

$$Q_{C1} = DTI_L$$

When the $C_{F2}$ is charged under 302 states, the charge amount is equal to the discharging amount of the $C_{F1}$ and the inductance L, which is the charging amount under 101 state and the discharging amount under 302 state, and is the changing amount of the average inductance current in the whole cycle:

$$Q_{C2} = TI_L$$

Therefore, the total charge amount of two capacitors totally supplied to the load in a cycle is as follows:

$$Q_C = Q_{C1} + Q_{C2}$$

The charge amount of the inductance supplied to the load in a cycle is as follows:

$$Q_L = TI_L$$

The requirement of the charge amount of the output load in a cycle is $TI_{OUT}$;

Combining with the above formula, it can obtain the ratio between the average inductance current and the load current.

$$Q_{C1} + Q_{C2} + Q_L = DTI_L + TI_L + TI_L = TI_{OUT} \qquad (7)$$

$$\frac{I_L}{I_{OUT}} = \frac{1}{2+D} = \frac{1-M}{2} \qquad (8)$$

Comparing with the above existed solution, the solution of the present application uses same number of the transistors and the passive elements, in which the withstanding voltage of each transistor are same, respectively, thus the additional withstanding voltage problem is not introduced.

For the formula (6), the transistor voltage conversion is (0, 1/3); by comparing with the formulas (1) and (5), the voltage drop, when the inductance is charged in the present Embodiment, is same as the solution of the existing technology in FIG. 1, which are both $V_{IN}$–$3V_{OUT}$, however, the discharge slope in the present Embodiment is –$2V_{OUT}$, and is two times of the solution of the existed solution. By comparing with the formulas (3), (4) and (7), (8), it can be known that, in the present Embodiment, the flying capacitor $C_{F2}$ can store and release more charge $Q_{C2} = TI_L$, which is 1/D time of the solution of the existing technology in FIG. 1. Therefore, whether it is under the same duty cycle or under the same conversion rate, the average inductance current of the present application is always less than the average inductance current of the solution of the existing technology in FIG. 1, which reduces the average inductance current by nearly half at most compared to the solution in FIG. 1.

Figure 9:
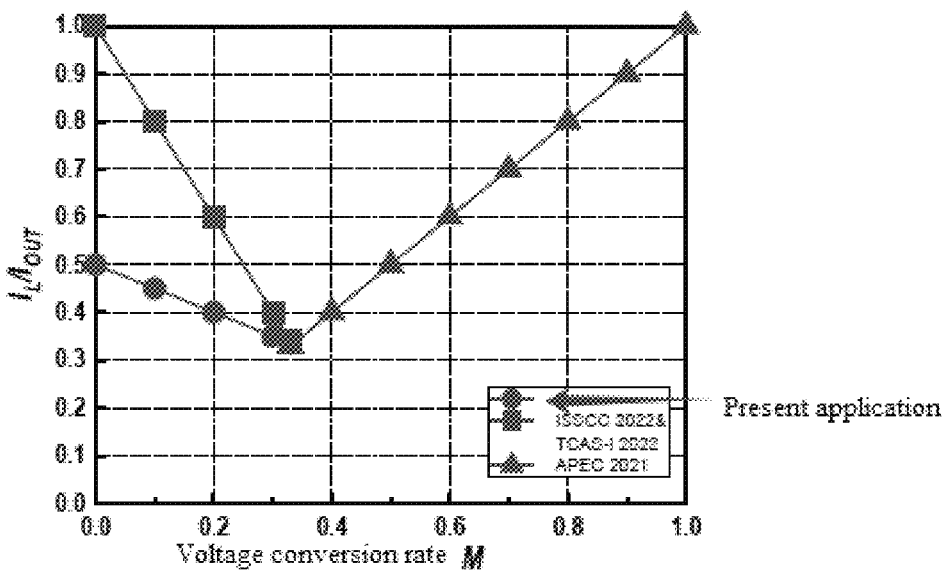
FIG. 9 is a schematic relationship view of a current ratio and a voltage conversion rate between the circuit shown in FIG. 6 and the circuit shown in FIG. 1.

The relationship between the current ratio and the voltage conversion rate of the solution related to the present Embodiment and the solution related in FIG. 1, respectively, are show in FIG. 9. It can be directly seen in drawings that the ratio between the average inductance current and the load current in the present Embodiment is (⅓, ½), and it realizes that the average inductance current is less than ½ time of the load current in the total duty cycle range, which means that the solution of the present application realizes a high conversion rate while greatly reducing the average inductance current, thereby reducing the conduction loss of the inductance, and improving the system efficiency. On the basis, it is not necessary to use the power inductor with relatively large magnitude and relatively small DCR to reduce the conduction loss of the inductance, thereby avoiding the incensement of the magnitude of the direct current-direct current converter and the reduction of the whole power density. Further, on the premise of ensuring same inductance loss, it can use a power inductor with smaller magnitude and larger direct current impedance to reduce the magnitude of the direct current—direct current conversion, and to improve the whole power density.

In some Embodiments, the switching frequency of the conversion corresponding to the above direct current—direct current conversion current can be 0.5 MHz~2 MHz. In particular, the inductance value of the power inductor can is 0.1 µH~4.7 µH, and in this range, the inductance value is higher, by which the output voltage ripple is less; and the capacitor value between two flying capacitors and the output capacitor can is 1 µF~20 µF, in this range, the capacitor value is higher, such that the output voltage ripple is less, thereby improving the output load performance. Correspondingly, the incensement of the inductance value will increase the magnitude of the inductance, therefore, in some implementation ways, the inductance value can be selected in the middle range, such as 1 µH, 2 µH, 3 µH and other values, thereby balancing the output performance and the element magnitude.

Figure 10:
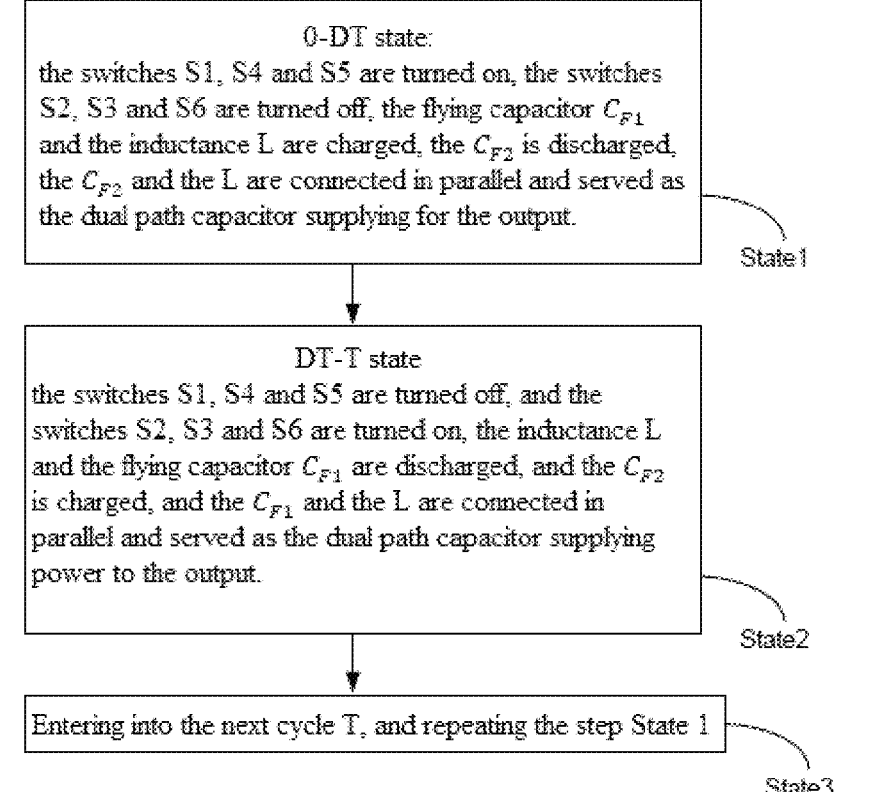
FIG. 10 is a flowchart of the steady state work control method of the circuit in the present application shown in FIG. 6.

FIG. 10 is a flowchart of the steady state work control method for the above direct current—direct current conversion current of the present application, the method includes as follows:

State 1, in the 0-DT, the switches S1, S4 and S5 are controlled to be turned on, the switches S2, S3 and S6 are controlled to be turned off, so as to enter to state 301. The flying capacitor $C_{F1}$ and the inductance L are charged, the $C_{F2}$ is discharged, and at this time, the $C_{F2}$ and the L are connected in parallel and served as the dual path capacitor supplying for the output.

State 2, in the DT-T, the switches S1, S4 and S5 are controlled to be turned on, and the switches S2, S3 and S6 are controlled to be turned off, so as to enter to 302. The inductance L and the flying capacitor $C_{F1}$ are discharged, and the $C_{F2}$ is discharged, thereby forming the charge conservation with the behavior of last state, and at this time, $C_{F1}$ and the L are connected in parallel and served as the dual path capacitor supplying power to the output.

State 3, entering into the next cycle T, and repeating the step State 1.

Figure 11:
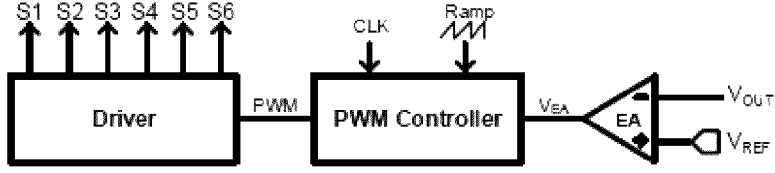
FIG. 11 is a schematic structure view of a control stage circuit of the present application.

In another Embodiment of the present application, it supplies a control stage current, which can control the direct current—direct current conversion circuit in the above Embodiment, and targets the method shown in FIG. 10. The structure of the control stage circuit is shown in FIG. 11, which is composed of the error amplifier EA and the PWM generator to form a feedback loop, the error signal $V_{EA}$ is acquired by comparing the difference between the output $V_{OUT}$ and the baseline voltage $V_{REF}$, the control signal PWM is generated according to the magnitude relationship between the error signal $V_{EA}$ and the ramp signal Ramp, the drive signal of the transistor is generated by the drive circuit Driver, and the duty cycle of the control signal is adjusted to stabilize the output voltage $V_{OUT}$ to the baseline voltage.

The key point of the present solution is as follows: comparing with the traditional multi-level hybrid step-down direct current—direct current conversion, the new dual path hybrid step-down DC-DC conversion topology structure provided in the present application can realize the automatic balance of the voltage of the flying capacitor, and it does not need additional flying capacitor voltage balance circuit to ensure the normal work of the system, thereby simplifying the design of the circuit control stage.

The main reason of the reduction of the inductance current is that the capacitor supplies additional charge for the load, therefore, the charge amount is larger, the reduction of the inductance current is higher, however, the charge amount only exists a few discrete values due to the limitation of the inductance, and the charge amount of the single flying capacitor is $DTI_L$ in the work, which can be understood by combining the formula (3). A highlight of the present application is to improve a charge amount of the flying capacitor to a limit value $TI_L$ in theory, which is $Q_{C2}$ in the formula (7). Since there is a physical limitation, under same number of the switches, the inductances and the capacitors, the charge amount of the flying capacitor cannot be higher, and another flying capacitor cannot be this highest charge amount, therefore, the solution of present application is a solution with the lowest average inductance current in the structure of two flying capacitors with one inductance.

Therefore, the topology structure of the present application realizes the high conversion rate output, which highly reduces the average inductance current under the premise that it does not increase number of the transistor and the passive element, by which the ratio of the topology and the load current is always less than ½, the conduction loss of the inductance is reduced, and the problem of the withstanding voltage of the transistor is not introduced, thereby improving the system efficiency; and under the same inductance loss with the existing work state, it can use the power inductor with smaller magnitude based on the topology structure of the present application, thereby saving the system area, and improving the power density.

In summary, the present application provides a new high performance dual path hybrid step-down direct current—direct current transistor, which possesses the flying capacitor voltage self-balance, does not require additional flying capacitor voltage balance circuit, easily controls stage circuit, realizes the large conversion rate output, does not add additional transistors and passive elements, the average inductance current thereof is less than ½ of the load current, greatly reduces the average inductance current, reduces the conduction loss of the inductance, improves the system efficiency; and under the premise of same inductance loss with the existing work state, it can use the chip inductance with smaller magnitude, thereby saving the system area, and improving the power density.

The original skill in the art can be understood that: all or portion steps of realizing above each method Embodiment can be completed by hardware related to program instructions. The above program can be stored in a computer readable storage media. When the program is executed, the steps including above method Embodiment are executed; the above storage medium includes: various mediums which can store program code such as ROM, RAM, disks, CDs, etc.

What is claimed is:

1. A direct current to direct current (DC-DC) conversion circuit, comprising: an input end, a first flying capacitor, a second flying capacitor, a power inductor, a first state switch, a second state switch, and an output end; wherein the first state switch comprises a first switch tube, a second switch tube and a third switch tube, and the second state switch comprises a fourth switch tube, a fifth switch tube and a sixth switch tube;

the input end, the first switch tube, the fifth switch tube, the third switch tube and the output end are successively connected; the first flying capacitor and the power inductor are connected in series and then connected in parallel at two ends of the fifth switch tube; a first end of the fourth switch tube is connected to a connection point of the first switch tube with the power inductor, a second end of the fourth switch tube is connected to ground; the second flying capacitor and the sixth switch tube are connected in series and then connected in parallel at two ends of the third switch tube, a first end of the second switch tube is connected to a connection point of the second flying capacitor with the sixth switch tube, and a second end of the second switch tube is connected to the ground;

when the first state switch is turned on and the second state switch is turned off, the input end, the first flying capacitor, the power inductor, the second flying capacitor and the output end are connected, the power inductor and the second flying capacitor supply power to the output end, and the first flying capacitor and the power inductor are charged; and when the first state switch is turned off and the second state switch is turned on, the first flying capacitor, the power inductor, the second flying capacitor and the output end are connected, the power inductor and the first flying capacitor supply power to the output end, and the second flying capacitor is charged.

2. The DC-DC conversion circuit according to claim 1, wherein, when the first state switch is turned on and the second state switch is turned off, and the input end, the first flying capacitor, the power inductor, the second flying capacitor and the output end are connected, the input end, the first switch tube, the first flying capacitor, the power inductor, the third switch tube and the output end are successively connected;

the second switch tube and the second flying capacitor are connected in series; and an end of the second flying capacitor, which is not connected to the second switch tube, is connected to a connection point of the power inductor with the third switch tube; and the second switch tube is connected to the ground.

3. The DC-DC conversion circuit according to claim 1, wherein, when the first state switch is turned off and the second state switch is turned on, and the first flying capacitor, the power inductor, the second flying capacitor and the output end are connected, the fourth switch tube, the first flying capacitor, the fifth switch tube, the second flying capacitor, the sixth switch tube and the output end are successively connected; and a first end of the power inductor is connected to a connection point of the fourth switch tube with the first flying capacitor, and a second end of the power inductor is connected to a connection point of the fifth switch tube with the second flying capacitor.

4. The DC-DC conversion circuit according to claim 1, wherein the output end comprises an output capacitor, and an end of the output capacitor is connected to the ground.

5. The DC-DC conversion circuit according to claim 1, wherein a switching frequency of the DC-DC conversion circuit is 0.5 MHz-2 MHZ, and the switching frequency is determined by states of the first state switch and the second state switch;

an inductance value of the power inductor is 0.1 μH-4.7 μH;

a capacity value of the first flying capacitor is 1 μF-20 μF; and a capacity value of the second flying capacitor is 1 μF-20 μF.

6. A direct current to direct current (DC-DC) converter, comprising: the DC-DC conversion circuit according to claim 1.

7. The DC-DC converter according to claim 6, further comprising: a control stage circuit;

the output end of the DC-DC conversion circuit is connected to an input end of the control stage circuit; and an output end of the control stage circuit is connected to the first state switch and the second state switch.

8. The DC-DC converter according to claim 7, wherein the control stage circuit comprises an error amplifier, a pulse width modulation (PWM) generator and a drive circuit, which are successively connected;

an output end of the error amplifier is connected to the output end of the DC-DC conversion circuit and an output end of a reference voltage, respectively, and the error amplifier is configured to compare an output voltage with the reference voltage to obtain an error signal and to output the error signal to the PWM generator;

an input end of the PWM generator is connected to an output end of a ramp signal and an output end of a clock signal, and the PWM generator is configured to generate a control signal according to a magnitude relationship between the error signal and the ramp signal, and output the control signal to the drive circuit; and the drive circuit is configured to generate a drive signal according to the control signal and output the control signal to the first state switch and the second state switch.

9. A method for controlling the direct current to direct current (DC-DC) conversion circuit according to claim 1, comprising:

in a first period of each cycle, controlling the first state switch to be turned on and the second state switch to be turned off, such that the input end, the first flying capacitor, the power inductor, the second flying capacitor and the output end are connected, the power inductor and the second flying capacitor supply power to the output end, and the first flying capacitor and the power inductor are charged; and in a second period of each cycle, controlling the first state switch to be turned off and the second state switch to be turned on, such that the first flying capacitor, the power inductor, the second flying capacitor and the output end are connected, the power inductor and the first flying capacitor supply power to the output end, and the second flying capacitor is charged.

* * * * *